June 26, 1962 B. HURKO ET AL 3,040,730
SMOKE AND HEAT CONTROL FOR CHARCOAL GRILL
Filed Sept. 28, 1960 2 Sheets-Sheet 1

INVENTORS
BOHDAN HURKO
& MILTON S. WILLIAMS, JR.
BY Richard L. Caslin
THEIR ATTORNEY

*INVENTORS*
BOHDAN HURKO
BY & MILTON S. WILLIAMS, JR

THEIR ATTORNEY

United States Patent Office 3,040,730
Patented June 26, 1962

3,040,730
SMOKE AND HEAT CONTROL FOR CHARCOAL GRILL
Bohdan Hurko and Milton S. Williams, Jr., Louisville, Ky., assignors to General Electric Company, a corporation of New York
Filed Sept. 28, 1960, Ser. No. 58,936
5 Claims. (Cl. 126—25)

This invention relates generally to cooking apparatus and particularly to charcoal broiling apparatus and electric "charcoal" broiling apparatus using ceramic briquettes or the like.

Charcoal broiling imparts to foods a distinctive flavor which results from the smoke and vapors that rise from the coals and circulate about the food. Under the influence of heat, foods such as meat and poultry give off juices or drippings of grease which fall on the hot charcoal and are ignited or vaporized to provide a high temperature flame. While the smoke thus generated is desirable to a certain extent to obtain the charcoal flavor, it can become annoying when it is present in great quantities. A possible solution to this problem would be to displace the meat farther from the coals, since less heat would result and the grease drippings would diminish. This is not a trouble-free solution since the cooking speed would also be reduced. When the meat is to be cooked rare, it is necessary to have an intense heat to sear the surface of the meat in a short time which in the usual charcoal broiling apparatus means that clouds of smoke are evolved.

It is therefore a principal object of this invention to provide a charcoal broiling apparatus in which the quantity of smoke produced can be controlled while the speed of cooking can be increased.

It is also an object of this invention to provide a charcoal broiling apparatus in which the heat can be directed or focused toward or away from the food being cooked so as to be able to govern the intensity of the heat as in electric and gas ranges.

It is a further object of this invention to provide an exposed grill in which the heat desired can be obtained with a minimum evolution of smoke.

Briefly stated the preferred embodiment of this invention includes a plurality of fireboxes for containing charcoals that are movably supported beneath a vertically adjustable grill surface. A first adjusting means is provided for adjusting the vertical position of the grill above the fireboxes, a second adjusting means is provided for adjusting the proportional areas of the fireboxes lying beneath the grill and a third adjusting means is provided for adjusting the angular position of the fireboxes relative to the grill surface.

The invention will be better understood from the following description taken in connection with the accompanying drawings and its scope will be pointed out in the appended claims.

Figure 1:
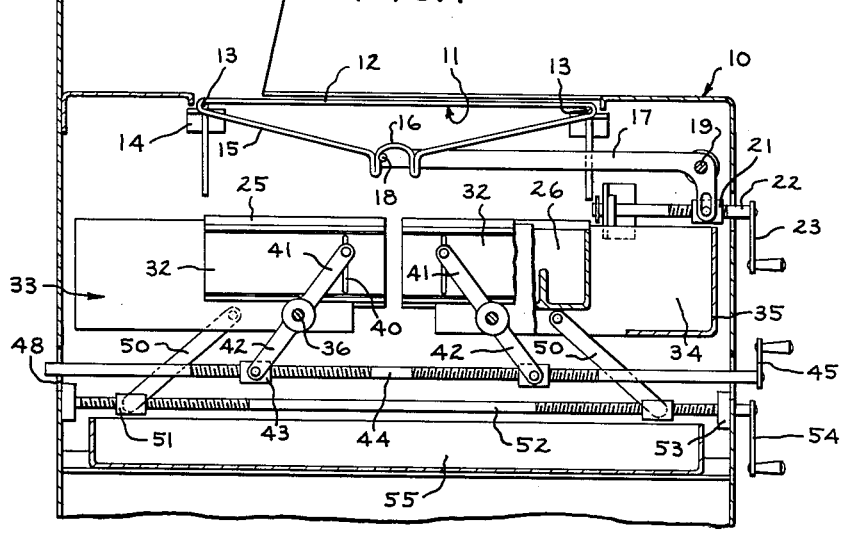
FIGURE 1 is a left side elevational view partly in cross-section of a portion of a charcoal broiling apparatus employing adjustable fireboxes according to the present invention.
Figure 2:
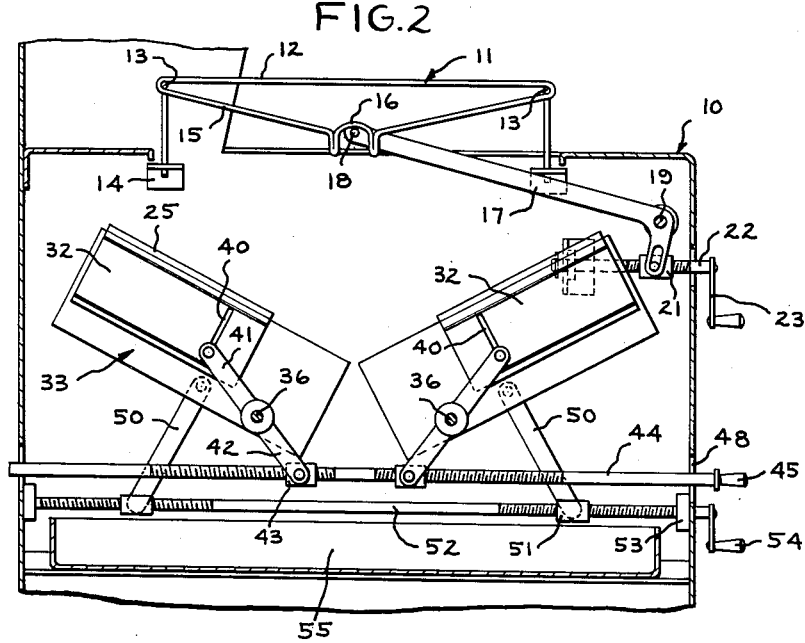
FIGURE 2 is a view similar to FIGURE 1 showing the grill in the raised position and the fireboxes separated from each other and adjusted angularly to provide focused heat.
Figure 3:
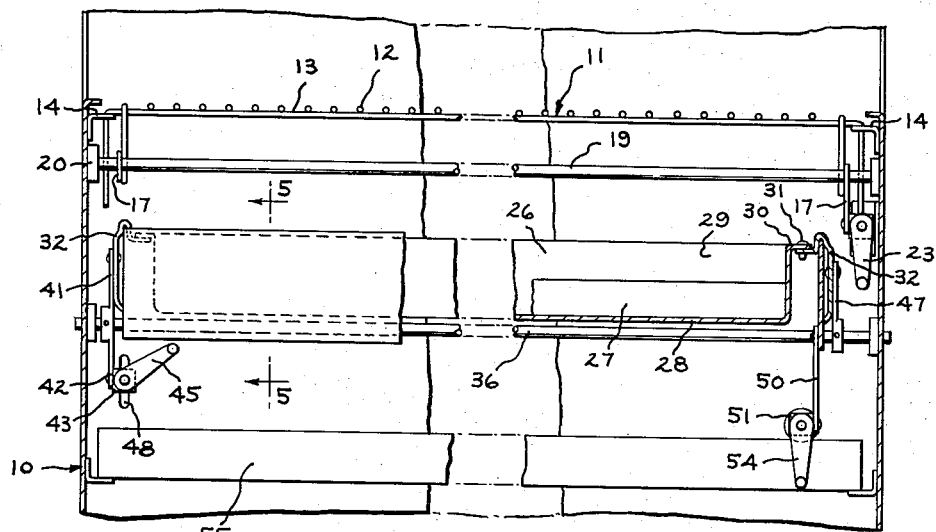
FIGURE 3 is a front elevational view partly in cross-section of the apparatus of FIGURE 1 with the front wall removed.

Referring now to FIGURES 1 and 3 of the drawings, a supporting or cabinet structure 10 is provided to contain the various components and to provide support for these components. A generally rectangular grill surface or rack 11 is supported on the top thereof so as to be vertically adjustable. The grill surface 11 is of welded wire construction having parallel wire members 12 extending horizontally from the front to the rear of the grill 7. These parallel wire members 12 are supported at the front and rear by transversely extending generally down-turned U-shaped wire members 13. The downwardly extending legs of the U-shaped wire members 13 pass through guide brackets 14 which are attached to the interior of the side walls of the supporting structure 10. These guide brackets 14 serve to prevent movement of the grill surface 11 in any direction other than a vertical direction. A wire member 15 is connected between the front and rear U-shaped wire members 13 at each side of the grill. Each side member 15 has a centrally disposed downwardly extending socket portion 16. As can be seen in FIGURES 1 and 2, the grill 11 is raised by a lever 17 located at each side of the grill. Each lever has at its innermost end a transverse pin 18 that is positioned in one of the sockets 16. The levers 17 are both fixed on a common transverse shaft 19 that is rotatably supported in bearings 20 at the sides of the supporting structure. The right hand lever 17 is a bell crank lever that has an end loosely connected to a threaded sleeve 21 which is threaded onto a screw shaft 22. The shaft 22 is supported in suitable bearings and is adapted to be turned by a hand crank 23 at the front of the apparatus. The mechanism for adjusting the vertical height of the grill 11 as described above does not form part of the present invention but merely serves to describe the cooperating structure for the adjustable fireboxes to be described hereinafter.

Figure 4:
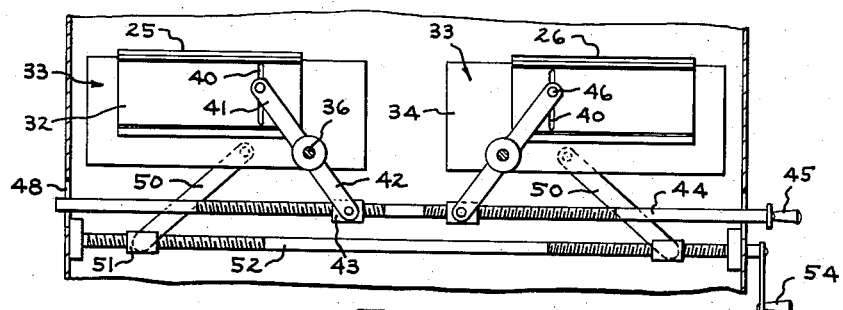
FIGURE 4 is a fragmentary view similar to FIGURE 1 showing the fireboxes separated from each other.
Figure 5:
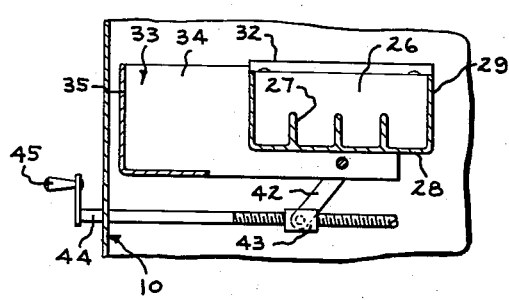
FIGURE 5 is a cross-sectional elevational view taken on the line 5—5 of FIGURE 3.

Referring to FIGURE 1, there are two fireboxes 25 and 26 shown in side view closely positioned with respect to each other. These fireboxes are substantially duplicates in structure and they are adapted to contain charcoal or a similar fuel as well as gas burners or electric heating elements. Each firebox has a number of parallel vertical separation plates 27 as is best seen in FIGURE 5. These separation plates are adapted to maintain the charcoal evenly distributed in the firebox when the fireboxes are raised to the inclined position shown in FIGURE 2. Referring to FIGURES 3, 4 and 5 of the drawing, each firebox 25 and 26 is of shallow pan construction having a bottom wall 28 and four side walls 29 with an open top that is provided with an outwardly extending flange 30 on two sides of the box as is best seen in FIGURE 3. Joined to each flange 30 by suitable fasteners 31 is a sliding member 32. These two sliding members are adapted to be supported on a three-sided box-like frame member 33 having parallel side walls 34 and a connecting wall 35 so as to suspend the firebox therefrom. These side walls 34 serve as rails on which the sliding members 32 are adapted to move back and forth. The idea is that if the smoke becomes excessive the fireboxes may be separated so that some or all of the grease drippings may fall between the fireboxes rather than onto the coals whereby the grease does not ignite and cause a smoke hazard. Each three-sided frame 33 is loosely supported on a transverse supporting shaft 36 that is rotatably mounted from the side walls of the cabinet structure 10.

Turning now to a consideration of the mechanism for effecting the sliding movement of the fireboxes 25 and 26, attention is directed to FIGURE 4. This figure shows the left sides of the two fireboxes and it is to be understood that the sliding members 32 on this side are each provided with a vertical elongated slot 40. This slot serves as a guiding means for one end of a link member 41 that is fixedly mounted near its center on the shaft 36. Moreover, this link 41 has an extension arm 42 which is pivotally connected to a threaded sleeve 43 that travels on a screw shaft 44. Notice that the threads for cooperation with the firebox 25 are turned in one direction while the threads for cooperation with the other firebox 26 are turned in the reverse direction. This is necessary so that the two sleeves 43 will always travel either toward or away from each other rather than in the same direction. The screw shaft 44 has a front extension that terminates in a hand crank 45 for manual adjustment of the position of the sleeves 43 on the shaft. The link 41 is provided with a pin 46 at its free end which rides in the vertical slot 40 so that the turning movement of the link will not raise the firebox but will merely exert a horizontal force tending to shift the firebox either toward or away from the opposite firebox. The shaft 36 carries a link 47 at its right hand end as seen in FIGURE 3 similar to the link 41 except that it has no extension such as 42 since there is only one operating screw shaft 44 for adjusting the position of the firebox. In order to permit arcuate movement of sleeves 43 while the links 41 swing through their arcs of movement about the axes of the shafts 36, the screw shaft 44 is guided in vertical slots 48 which are formed in both the front and back walls of the supporting cabinet 10.

The mechanism for varying the angular adjustment of the fireboxes will be explained with reference to FIGURES 2 and 4. Each frame 33 is provided with a link member 50 that is pivotally connected to only one side wall 34 thereof and is connected at its opposite end to a threaded sleeve 51 which is threaded onto a screw shaft 52. This shaft 52 is rotatably mounted in bearings 53 in the front and back walls of the supporting structure 10 as is best seen in FIGURE 2. The front of the shaft 52 is extended to include a hand crank 54 for varying the position of the threaded sleeves 51 on the shaft. Turning the crank 54 in the counter-clockwise direction will bring the two sleeves 51 together thereby raising the link members 50 from the position shown in FIGURE 4 and pivoting the pair of three-sided frame members 33 about the respective shafts 36 to the angular positions shown in FIGURE 2. Similarly the turning of the crank 54 in the opposite direction will separate the sleeves 51 and lower the frames and the fireboxes 25 and 26 are carried thereby to the horizontal position shown in FIGURE 4. A large drip pan 55 is positioned below the fireboxes and is of such size as to nearly cover the entire base area of the apparatus so as to collect and retain all food and grease spatterings as well as fuel dust that might fall either from the grill 11 or the fireboxes 25 and 26.

Having described above our invention of an exposed grill for either indoor or outdoor use having adjustable fireboxes for obtaining smoke control, it will be readily apparent to those skilled in this art that smoke control has been obtained by the use of adjustable fireboxes for varying the amount of area of the fireboxes positioned under the food to be cooked. If smoking of the heat source is objectionable the fireboxes may be completely withdrawn from under the food. If this tends to slow down the cooking speed to an undesirable rate then the fireboxes may be tilted so as to focus the heat toward the food while at the same time the fireboxes remain out from under the food. If it is found desirable to reduce the speed of cooking, it is clear that the fireboxes may be focused away from the food being cooked to effect a control that is comparable to that in electric and gas ranges.

While this invention has been described with particular emphasis on charcoal as the heat source it is clearly possible that the same invention could be used with gas burners or electric heating elements either with or without ceramic briquettes to give the illusion of a charcoal bed. The drawings illustrate two simultaneously adjustable fireboxes but it is evident that more than two fireboxes could be utilized or alternatively a single firebox could be movable while a second firebox could be made stationary. Another modification would be to have separate control mechanisms for each firebox rather than having them move simultaneously.

Other modifications of this invention will occur to those skilled in this art and it is to be understood, therefore, that this invention is not limited to the particular embodiments disclosed but that it is intended to cover all modifications which are within the true spirit and scope of this invention as claimed.

What we claim as new and desire to secure by Letters Patent of the United States is:

1. A broiling apparatus comprising a supporting structure, a grill surface carried by said structure, a plurality of fireboxes positioned below the grill for containing a heat source, means to movably support each of said fireboxes on said structure, adjusting linkage interconnecting each of said fireboxes and said structure for movement of the fireboxes toward and away from each other to simultaneously adjust the proportional area of said fireboxes lying directly beneath said grill and the area of the fireboxes lying off to the side of the grill, and angular adjusting linkage interconnecting each of said fireboxes and said structure to simultaneously adjust the angle of direction of each of said fireboxes toward and away from said grill.

2. A charcoal broiling apparatus comprising a containing and supporting framework, a grill surface carried by said framework, two fireboxes located beneath the grill surface and adapted to contain charcoal, the fireboxes being slidably mounted on movable frame members, each of said frame members being pivotally supported at two points by said supporting framework and supported at a third point by a fastener, each of said fasteners connected by motion and force transmitting mechanisms to a first operating handle whereby movement of said first operating handle will cause a change in the angular position of each of said frame members, and each of said fireboxes connected by motion and force transmitting mechanisms to a second operating handle whereby movement of said second operating handle will cause a movement of said fireboxes toward and away from each other on said frame members.

3. A charcoal broiling apparatus comprising a supporting structure, a vertically movable grill surface, adjusting linkage interconnecting said grill surface and said supporting structure to vertically adjust the position of said grill surface, a plurality of fireboxes positioned below the grill for containing charcoal, means to movably support each of said fireboxes on said structure, adjusting linkage interconnecting each of said fireboxes and said structure to simultaneously adjust the proportional area of said fireboxes lying directly beneath said grill and the area of the fireboxes lying off to the side of the grill, and angular adjusting linkage interconnecting each of said fireboxes and said structure to simultaneously adjust the angle of direction of each of said fireboxes toward and away from said grill.

4. A charcoal broiling apparatus comprising a supporting structure, a vertically movable grill surface, adjusting linkage interconnecting said grill surface and said supporting structure to vertically adjust the position of said grill surface, a plurality of fireboxes positioned below the grill for containing charcoal, means to movably support each of said fireboxes on said structure, adjusting linkage interconnecting each of said fireboxes and said structure to simultaneously adjust the position of the fireboxes toward and away from each other and hence the proportional area of said fireboxes lying directly beneath said grill and the area of the fireboxes lying to the side of the grill.

5. A charcoal broiling apparatus comprising a supporting structure, a vertically movable grill surface, adjusting linkage interconnecting said grill surface and said supporting structure to vertically adjust the position of said grill surface, a plurality of fireboxes positioned below the grill for containing charcoal, means to movably support each of said fireboxes on said structure, and angular adjusting linkage interconnecting each of said fireboxes and said structure to simultaneously adjust the angle of direction of each of said fireboxes toward and away from said grill.

References Cited in the file of this patent

UNITED STATES PATENTS

| | | |
|---|---|---|
| 505,433 | Boggs | Sept. 26, 1893 |
| 1,694,211 | Fernandez | Dec. 4, 1928 |
| 2,848,592 | Mergen | Aug. 19, 1958 |
| 2,885,950 | Stoll et al. | May 12, 1959 |
| 2,950,712 | Terry | Aug. 30, 1960 |

FOREIGN PATENTS

| | | |
|---|---|---|
| 484,518 | France | Oct. 16, 1917 |